(12) United States Patent
Buchanan

(10) Patent No.: US 9,754,213 B2
(45) Date of Patent: *Sep. 5, 2017

(54) REASONING OVER CYCLICAL DIRECTED GRAPHICAL MODELS

(71) Applicant: International Business Machines Corporation, Armonk, NY (US)

(72) Inventor: David W. Buchanan, Pleasantville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 214 days.

This patent is subject to a terminal disclaimer.

(21) Appl. No.: 14/644,340

(22) Filed: Mar. 11, 2015

(65) Prior Publication Data

US 2016/0055414 A1 Feb. 25, 2016

Related U.S. Application Data

(63) Continuation of application No. 14/463,774, filed on Aug. 20, 2014.

(51) Int. Cl.
*G06N 7/00* (2006.01)

(52) U.S. Cl.
CPC .................. *G06N 7/005* (2013.01)

(58) Field of Classification Search
CPC G06N 7/00; G06N 7/005; G06N 5/02; G06N 5/022; G06N 5/04; G06N 99/005
USPC .................................................... 706/11–12
See application file for complete search history.

(56) References Cited

U.S. PATENT DOCUMENTS

| 6,154,736 A * | 11/2000 | Chickering | G06N 7/005 706/45 |
| 2005/0131848 A1* | 6/2005 | Chickering | G06N 99/005 706/12 |
| 2005/0212818 A1* | 9/2005 | Hudson | G06F 17/30958 345/619 |
| 2005/0216496 A1* | 9/2005 | Chickering | G06N 7/005 |
| 2014/0108321 A1* | 4/2014 | Buchanan | G06N 5/02 706/50 |

(Continued)

OTHER PUBLICATIONS

List of IBM Patents or Patent Applictions Treated as Related; (Appendix P), Filed Apr. 17, 2015, 2 pages.

(Continued)

*Primary Examiner* — Dave Misir
(74) *Attorney, Agent, or Firm* — Cantor Colburn LLP; William Stock

(57) ABSTRACT

According to an aspect, a cyclical directed graphical model that includes a plurality of nodes connected by directed edges is accessed. Each directed edge has an edge strength indicating a degree of relation between the nodes, and each node has a value and a state of either active or inactive. A first node that has at least one directed incoming edge from a second node having a state of active is selected. At least a subset of the nodes in the cyclical directed graphical model are traversed in a reverse direction relative to the directed edges. The traversing is performed along a path starting from the second node and ending at a third node having a state of active. If the path does not include the first node, an inference about a value of the first node is proposed based on a value of the second node.

8 Claims, 7 Drawing Sheets

(56) References Cited

U.S. PATENT DOCUMENTS

| | | | | |
|---|---|---|---|---|
| 2014/0337306 A1* | 11/2014 | Gramatica | ........ | G06F 17/30731 707/706 |
| 2015/0106324 A1* | 4/2015 | Puri | ......................... | G06N 5/04 706/52 |
| 2015/0149484 A1* | 5/2015 | Kelley | .............. | G06F 17/30398 707/748 |

OTHER PUBLICATIONS

David W. Buchanan, Pending U.S. Appl. No. 14/463,774 entitled "Reasoning Over Cyclical Directed Graphical Models" filed Aug. 20, 2014.
David W. Buchanan, Pending U.S. Appl. No. 14/644,352 entitled "Influence Filtering in Graphical Models" filed Mar. 11, 2015.
David W. Buchanan, Pending U.S. Appl. No. 14/463,787 entitled "Influence Filtering in Graphical Models" filed Aug. 20, 2014.

* cited by examiner

REASONING OVER CYCLICAL DIRECTED GRAPHICAL MODELS

DOMESTIC PRIORITY

This application is a continuation of U.S. patent application Ser. No. 14/463,774, filed Aug. 20, 2014, the content of which is incorporated by reference herein in its entirety.

BACKGROUND

The present disclosure relates generally to graphical models, and more specifically, to reasoning over cyclical directed graphical models.

Graphical models are widely used in machine learning to represent the patterns of dependence between variables and to predict the probability of some variables given some other variables. In addition, graphical models are often used in artificial intelligence to perform causal inference and social network analysis. When deploying a graphical model, there is a basic choice of representation between undirected models and directed models. In general, while undirected models are more robust, they often allow less powerful inference when compared to directed models. Though directed models can support more powerful inference, there are often more constraints on their application. One such constraint is that most directed models must be acyclic, that is, it must not be possible to trace a path from a node back to itself by following directed edges in the graph. A Bayesian network is an example of a directed graphical model that must be acyclic. The restriction that a Bayesian network must be acyclic significantly reduces the applicability of Bayesian networks, especially in applications such as unstructured information processing where graphs are likely to have cycles because the data is noisy or incomplete. This is a loss because Bayesian networks are often significantly more expressive than their undirected counterparts.

SUMMARY

Embodiments include a method for reasoning over cyclical directed graphical models. A method includes accessing a cyclical directed graphical model in a data store that includes a plurality of nodes connected by directed edges. Each directed edge has an edge strength indicating a degree of relation between the nodes, and each node has a value and a state of either active or inactive. A first node is selected from the plurality of nodes. The first node has at least one incoming directed edge from a second node in the plurality of node. The incoming directed edge has an edge strength greater than zero and the second node has a state of active. At least a subset of the nodes in the cyclical directed graphical model are traversed in a reverse direction relative to the directed edges. The traversing is performed along a path starting from the second node and ending at a third node having a state of active. Based on the path not including the first node, an inference about a value of the first node is proposed based on a value of the second node.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein relate to reasoning over graphical models that have directed cycles. Embodiments, called recursion graphs, are a version of Bayesian networks that are allowed to have cycles while at the same time preserving many of the powerful inferences that are supported by directed graphs. One reason that contemporary directed graphs do not support cycles is that it is formally incoherent for a node in a graph to affect its own value. Imposing acyclicity (i.e., not allowing a path to be traced from a node back to itself by following directed edges) in a graphical model is one way of ensuring that this never happens. Imposing acyclicity on a graphical model however, can be a relatively drastic measure that eliminates some desirable properties of directed graphs. Embodiments described herein can allow cycles to be present by using a method that can prevent a node from affecting its own value by having the node keep track of its "reasons" (e.g., the edges leading to the node). An embodiment of the method is based on the assumption that A can only affect the value of B, if node A can trace a chain of nodes back to an evidence node without going through node B. Intuitively, node A can't be a reason for node B if all of node A's reasons go through node B. However, if node A has another reason that is not node B, then node A is allowed to be a reason for B.

As used herein, the term "evidence node" refers to a node in a recursion graph that is always in an active (or on) state, that is a node that doesn't require a reason to be in an active state. An evidence node is contrasted with a "non-evidence node" which, as used herein refers to a node that can be in either an active state or an inactive (or off) state. A non-evidence node is any node in a recursion graph that is not an evidence node. A non-evidence node can start out in a non-active state and requires a reason to be changed to an active state. Reasons for a node to be active can be indicated in a graphical model by directed edges and associated edge strengths in a path between a non-evidence node and an evidence node.

Directed graphs may be used to infer the marginal probabilities of unknown variables given known values of some set of other variables ("inference"). The resources at hand can include a set of relations between these variables that can be interpreted as a directed graphical model. This can be used, for example in predicting influence in a social network, in a recommendation system, and/or in a graph constructed from knowledge. All share the property that the graph potentially contains directed cycles, and that the edges in the cycles might carry important information. The simplest such case occurs when for some pair of nodes, an directed edge exists in each direction with a different strength.

Figure 1:
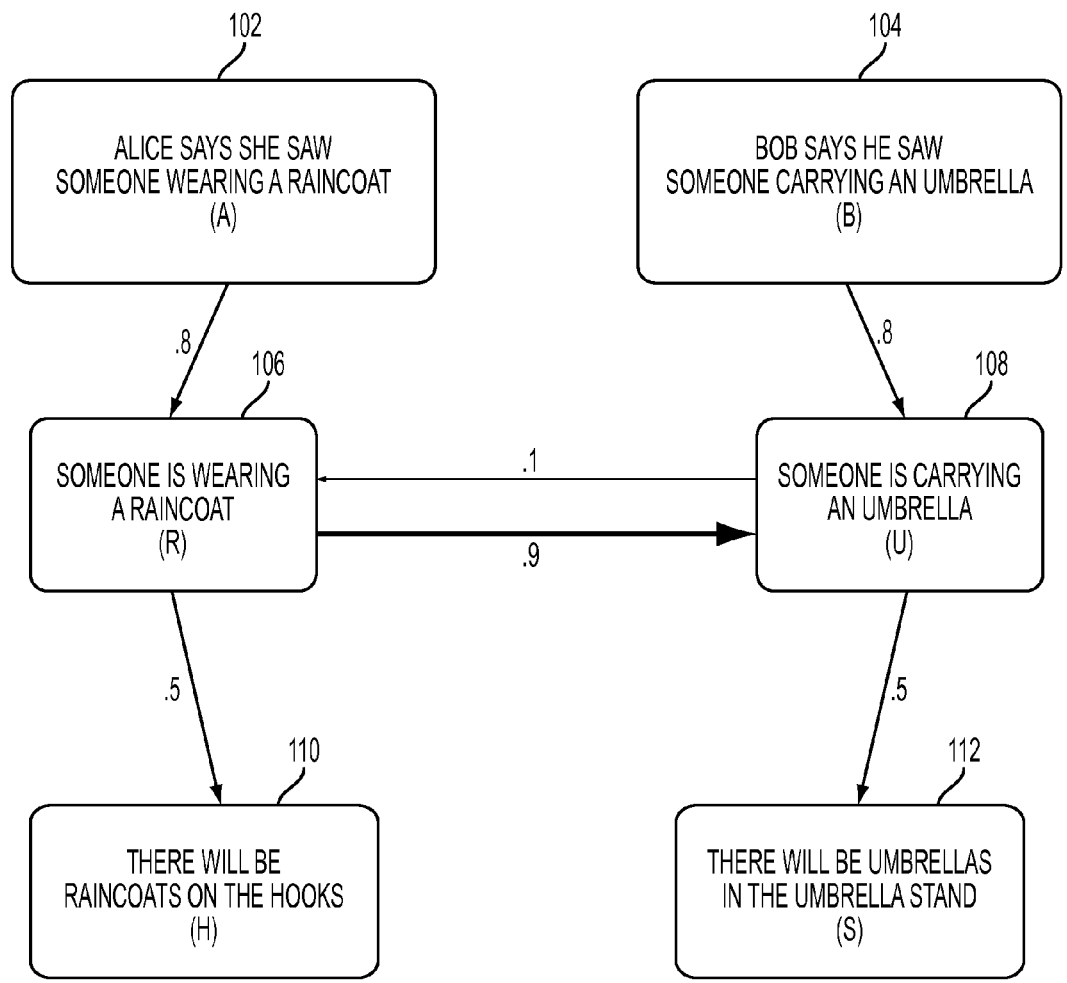
FIG. 1 depicts a cyclical directed graphical model in accordance with an embodiment.

Turning now to FIG. 1, a cyclical directed graphical model having a pair of nodes with edges of different strengths in each direction is generally shown in accordance with an embodiment. The graph represents the relations that it is known that Alice says that she saw someone wearing a raincoat (abbreviated as "A") as specified at node A 102, it is reason to think, with strength 0.8, that someone is wearing a raincoat (abbreviated as "R") as specified at node R 106. That is, if it is known that Alice says that she saw someone wearing a raincoat, then the probability that this is a good independent reason to think that someone is wearing raincoat, is 0.8. This reason for R given A is depicted by the directed edge from node A 102 to node R 106. Similarly, if Bob says that he saw someone carrying an umbrella (abbreviated as "B") as specified at node B 104, it is reason to think, with strength 0.8, that someone is carrying an umbrella (abbreviated as "U") as specified at node U 108. If someone is wearing a raincoat (R), this is a reason to think that people are carrying umbrellas (U), and vice versa.

In the example shown in FIG. 1, the relation from raincoats (R) to umbrellas (U) is 0.9 and therefore, stronger than the relation from umbrellas (U) to raincoats (R) which is 0.1. That is, if it is known that someone is wearing a raincoat (R), this is a strong reason to think that someone is carrying an umbrella (U). But if it is known that someone is carrying an umbrella (U), this is a relatively weak reason to think that someone is wearing a raincoat (R). This scenario might occur, for example, if only stronger rain made some people put on raincoats. Finally, the fact that someone is wearing a raincoat (R) is a reason to think that there will be coats on the hooks (abbreviated as "H") as specified at node H 110 with strength 0.5, and if someone is carrying an umbrella (U), this is a reason to think that there will be umbrellas in the umbrella stand (abbreviated as "S") as specified at node S 112 with strength 0.5.

Certain properties appear to be intuitive from the graph shown in FIG. 1, such as the properties that A provides strong support for H and the property that B provides strong support for S. In addition, the property that A provides good support for S also appears to be intuitive from the graph, as well as the property that B provides relatively weak but nonzero support for H. However, these intuitions do not work out mathematically unless a semantics that describes a coherent formalization of the graph as it is drawn can be specified. The directed cycle in the graph between R and U creates a formal problem due to the fundamental premise that it is incoherent for a node to influence its own value. With the cycle present in FIG. 1, U can provide support for R, and this very support can be used to support U in turn. Such a feedback loop is not desired in this case, that is the belief in R should not reinforce itself, and embodiments are directed to formalizing the graph so that such a feedback loop does not occur.

Figure 2:
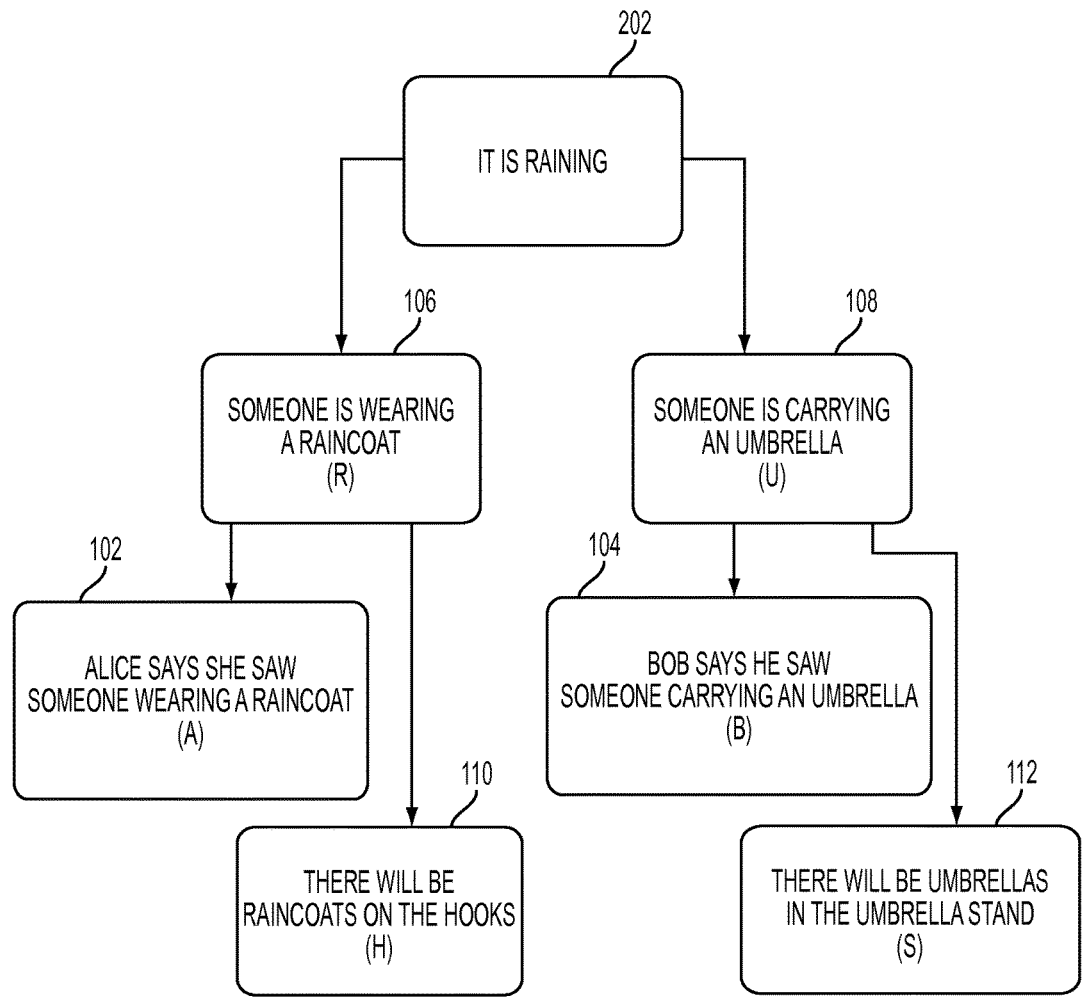
FIG. 2 depicts a non-cyclical directed graph.

One contemporary approach to preventing a feedback loop is to construct a fundamentally different acyclic graph such as that shown in FIG. 2, for example. The graphical model shown in FIG. 2 is based on the idea that it is logical that rain is a common cause of both umbrellas and raincoats. As shown in the graph in FIG. 2, if it is raining as specified at node 202, then there is reason to think that someone is wearing a raincoat (R) and that someone is carrying an umbrella (U). If someone is carrying an umbrella (U), this is a reason to think that there will be umbrellas in the umbrella stand (abbreviated as "S") as specified at node S 112. Thus, the graph shown in FIG. 2 indicates that both R and U are diagnostic of rain. Thus, there exists some set of conditional probabilities for FIG. 2 that could capture the conditions expressed above. This is a principled solution, but it relies on having additional knowledge about the scenario (e.g., that rain causes people to wear raincoats) and often the additional information is not available. It is not clear how to construct these models in general, especially if knowledge is limited.

Another approach is to avoid adding additional knowledge, but minimally modify the graph such that it is formally coherent. In other words, information can be subtracted from the graph. For example, in a Markov random field, the strength of the edge represents the compatibility between the values of the two nodes, but direction is not meaningful. Inference over a Markov random field tries to satisfy the constraint that nodes with strong compatibility take the same value. Referring back to FIG. 1, a contemporary approach that can be used to satisfy these constraints is to construct a single undirected relation on the two edges between R as specified at node 106 and U as specified at node U 108 (as well as any or all of the other edges). The strength of the undirected relation can be calculated as a function of the edges between the two nodes. If there are multiple such edges, they can be combined using some function (e.g., the maximum). It should be noted that no matter what combination function is used, important properties can be lost. For example, the graph can become completely symmetric with respect to A and B. The property that Alice (A) tells implies more about umbrellas in stands (U) than Bob (B) implies about raincoats on hooks (H) is lost.

Another approach is to treat the network as directed, but to orient edges such that cycles no longer exist. For example, the two edges between node R 106 and node U 108 can be replaced with a single directed edge from node R 106 to node U 108 with strength equal to the strength of the original edge from node R 106 to node U 108 (0.9). Other manners of combining the two edges between node R 106 and node U 108 can also be implemented. However, this approach also can result in losing important properties. For example, either Alice (A) has no influence on umbrellas (U) or Bob (B) has no influence on raincoats (R). This type of solution can be referred to as a combing solution because the cycles can be seen as "tangles" in the graph that are resolved by modifying the graph. A final approach is to abandon the idea of a formally coherent representation, and use the graph as it is, that is treat the graph as a Bayesian network and run inference despite the cycles. Contemporary solutions to dealing with cyclical directed graphs can be impractical (e.g., require new information to change the graph), formally incoherent (e.g., run inference on graph in typical fashion despite cycle), and/or result in lost information (e.g., use of Markov random fields, combing).

Neither adding casual knowledge, changing the graph to an undirected graph, nor allowing feedback loops capture the following type of intuition for the graph shown in FIG. 1: Bob's report (B) should provide some evidence for raincoats on the hooks (H); Alice's report (A) should provide better evidence for umbrellas in the umbrella stand (S); and raincoats (R) should not provide evidence for themselves. Embodiments described herein provide a way of instantiating such semantics and an algorithm for performing inference over cyclical directed graphs. Embodiments include having the nodes keep track of the reason (previous directed edges leading to the node) that they are in a particular state, where reasons can be traced recursively through the graph. Keeping track of reasons as described herein, can be used to prevent nodes from being reasons for themselves, without needing to eliminate cycles.

Embodiments view the Bayesian network in terms of "worlds." A world is an assignment of values to all the nodes in the graph. In the case of the graph in FIG. 1, each node in the Bayesian network might have one of two values: true or false. A directed edge in the graph expresses the relative likelihood that the nodes that the edge touches have different values. For example, a strong edge from X to Y normally expresses that worlds in which X is true, and Y is false, are unlikely. The marginal probability of the node (the rational degree of belief in the node according to the graph) can be the sum of the likelihood of the worlds in which the node is active divided by the total likelihood of all worlds. Embodiments described herein specify how the likelihoods of recursion graphs are specified in a novel way, and describe exactly how to calculate these likelihoods. Once these likelihoods have been specified, known methods (for instance, Metropolis-Hastings sampling, junction tree, or belief propagation) can be used to perform inference.

Consider as a base case the likelihood calculations for a simple noisy-logical Bayesian network. In a noisy-logical Bayesian network, a node is on if one of its generative parent edges "fires", off if one of its preventative parent edges fires, and off otherwise. Edges fire with probability proportional to the edge strength if the head is on. Consider a simple graph in which X causes Y with strength 0.8, and Y causes Z with strength 0.8, X is known to be true, and Y and Z are never true without being caused by X and Y, respectively. All possible worlds in this case can be enumerated. Worlds in which X is off have zero likelihood, so we will not consider them. Consider the world in which X is on, Y is on, and Z is on. This world has likelihood 0.8*0.8=0.64: it is given by the likelihoods of the two edges "firing." Consider further the world in which X is on, Y is on, and Z is off. This world has likelihood 0.8*0.2=0.16; it is given by the probability of one edge firing and another edge failing to fire. An additional world occurs when X is on, Y is off, and Z is off. This has likelihood 0.2; it is the probability that the edge from X to Y fails to fire. (The edge from Y to Z cannot fire if Y is off). The marginal probability of any node being on is the sum of the likelihoods of the worlds in which it is on, divided by the likelihood of all worlds. Thus the probability of Z being on is 0.64/(0.64+0.16+0.2)=0.64.

Recursion graphs can extend the semantics of noisy-logical Bayesian networks, but add an additional condition that prevents feedback loops. The condition is that an edge must be "eligible" to be a "reason" for the node that is its tail. Eligibility is defined recursively: the edge XY is eligible to be a reason for Y if X is eligible to be a reason for Y, and X is eligible to be a reason for Y if X has some reason WX that is eligible to be a reason for Y. Evidence nodes are always eligible to be a reason because by definition they are always active. In addition, nodes are not eligible to be a reason for themselves. That is, worlds in which nodes are reasons for themselves, directly or indirectly, are assigned zero likelihood. Otherwise recursion graphs operate like noisy-logical Bayesian networks.

Figure 3:
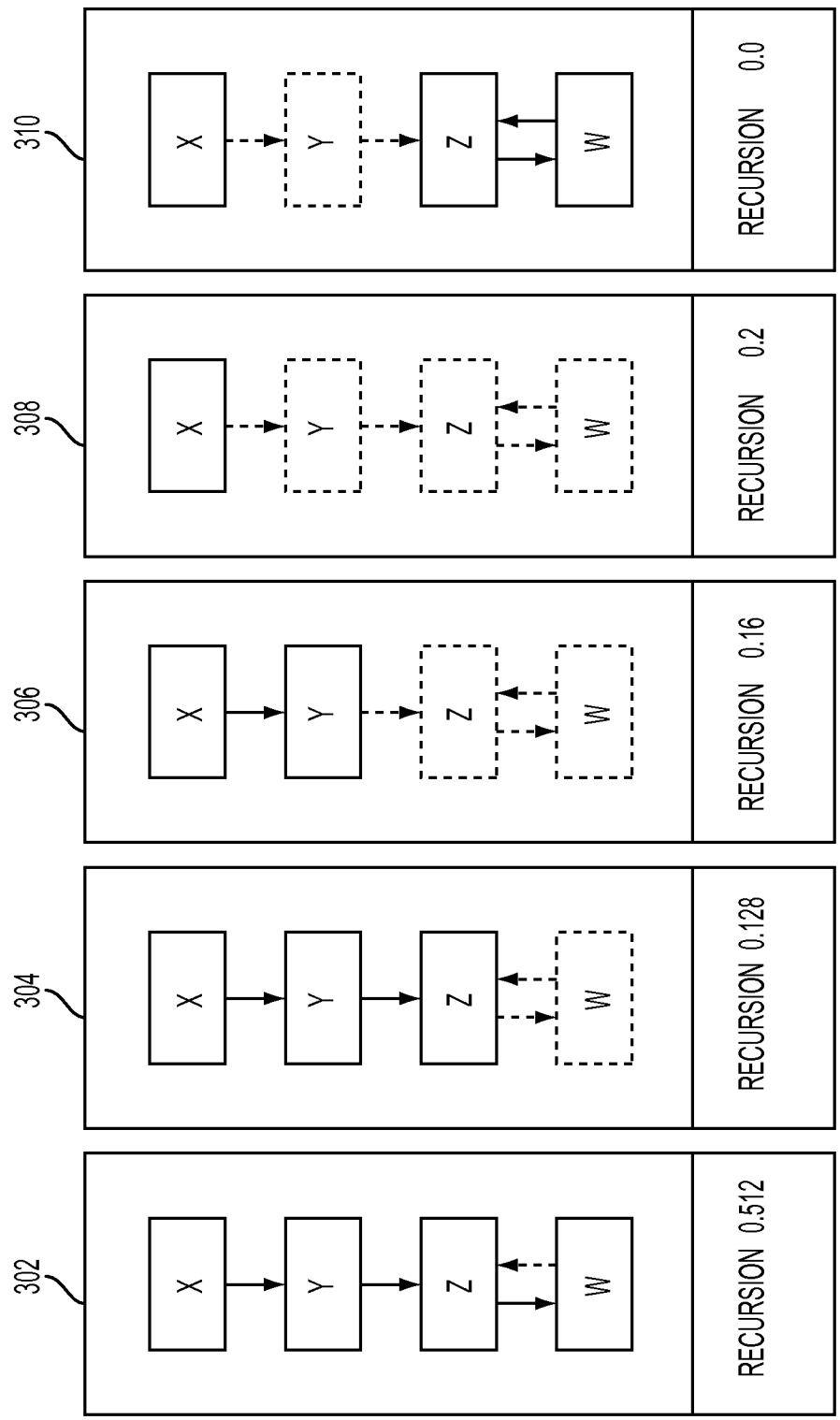
FIG. 3 depicts a block diagram of worlds that can be evaluated in a recursion graph in accordance with an embodiment.

Turning now to FIG. 3, worlds that can be evaluated in a recursion graph are generally shown in accordance with an embodiment. FIG. 3 includes five worlds that can be evaluated in a recursion graph. As shown in FIG. 3, a node is depicted as a solid line rectangle (e.g., the rectangle representing node X in world 302) if it is on (also referred to herein as being "active") and as a dashed line rectangle (e.g., the rectangle representing node W in world 304). Similarly, an edge is depicted as a solid line (e.g., the edge between node X and node Y in world 302) if it is a reason for its tail and as a dashed line (e.g., the edge between node Y and node Z in world 306) if it is not. For ease of explanation, the examples in FIG. 3 assume that each edge has a strength of 0.8. The worlds 302-310 have likelihoods as shown, calculated just as they would be in a noisy-logical Bayesian network.

World 310 as shown in FIG. 3 has zero likelihood, because it violates the constraints of recursion graphs. To see why world 310 has zero likelihood, the following algorithm can be deployed. For each node that is on, test whether each active reason is eligible, returning zero likelihood if it is not. In this case in world 310, node Z is on, and has one active reason because node W is active: the edge between node W and node Z (WZ). It is recursively checked to see if WZ is eligible to be a reason for node Z. WZ is eligible to be a reason for node Z if and only if node W is eligible to be a reason for node Z. A check is made to see if node W is eligible to be a reason for node Z. Node W has one active reason (or reason to be active), namely the edge between node Z and node W (ZW). It is recursively checked to see if ZW is eligible to be a reason for node Z. ZW is eligible to be a reason for node Z if and only if node Z is eligible to be a reason for node Z. Nodes are not eligible to be a reason for themselves, so the process is stopped and zero is returned as the likelihood. In a similar manner, the eligibility of reasons can be checked for any of the worlds shown in FIG. 3.

As shown in world 302, node W has one active reason, the edge from node Z to node W (ZW). Node Z in turn has one reason, the edge from node Y to node Z (YZ). Similarly, node Y has one reason, the edge from node X to node Y (XY). Node X is an evidence node which means that node X is eligible to be a reason for node Y, thus node Y is eligible to be a reason for node Z, and thus node Z is eligible to be a reason for node W to be active. The recursion likelihood of world 302 can be calculated as the product of the strengths of XY (0.8), YZ (0.8) and ZW (0.8), which is equal to 0.512.

As shown in world 304, node W has no active reasons. Node Z in turn has one reason, the edge from node Y to node Z (YZ). Similarly, node Y has one reason, the edge from node X to node Y (XY). Node X is an evidence node which means that node X is eligible to be a reason for node Y, thus node Y is eligible to be a reason for node Z. The recursion likelihood of world 304 can be calculated as the product of the strengths of XY (0.8), YZ (0.8) and the probability of both ZW and WZ not being active (e.g., not firing) (0.2), which is equal to 0.128.

As shown in world 306 nodes Z and W have no active reasons. Node Y in turn has one reason, the edge from node X to node Y (XY). Node X is an evidence node which means that node X is eligible to be a reason for node Y. The recursion likelihood of world 306 can be calculated as the product of the strengths of XY (0.8) and the probability of YZ not being active (e.g., not firing) (0.2), which is equal to 0.16.

As shown in world 308 nodes Y, Z, and W have no active reasons. Node X in turn has one reason, itself and since node X is an evidence node it is eligible to be a reason for itself. The recursion likelihood of world 308 can be calculated as the probability of XY not being active (e.g., not firing) which is 0.2.

Figure 4A:
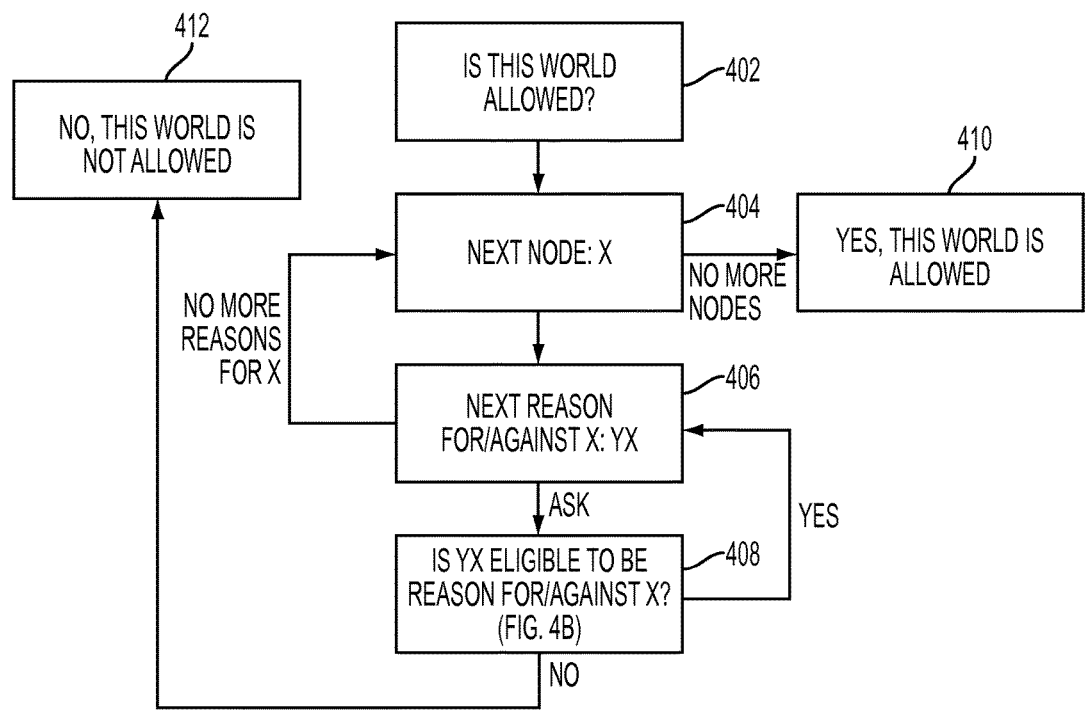
FIGS. 4A and 4B depict a flow diagram of a process for performing inference in a cyclical directed graph in accordance with an embodiment.
Figure 4B:
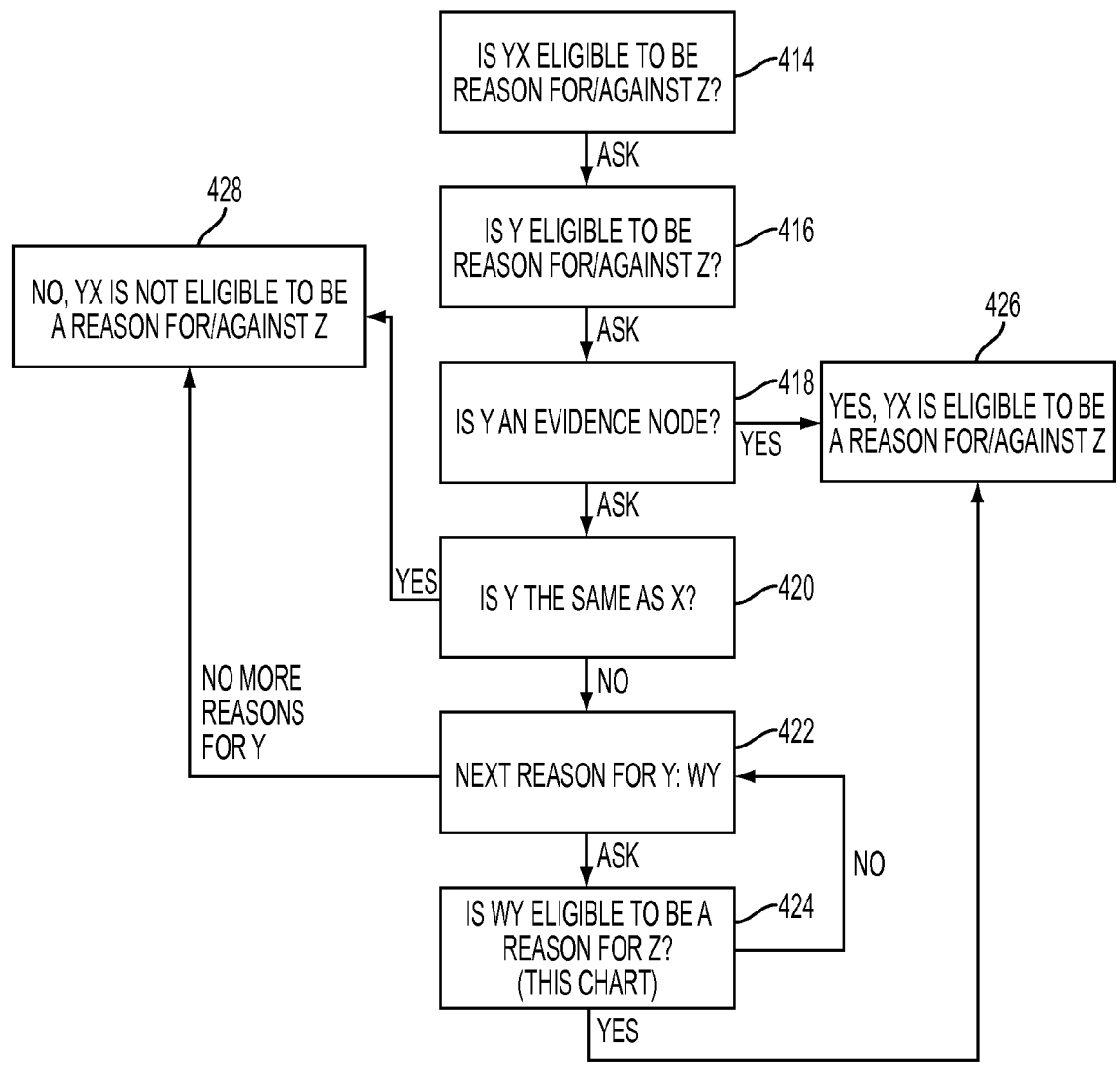

FIGS. 4A and 4B depict a flow diagram of a process for performing recursive inference in a cyclical directed graph in accordance with an embodiment. In this flow diagram, the names "X" "Y" and "W" are variables, for which the name of any node can be substituted. Embodiments are not limited the graphical models in FIG. 1 or 3 and in practice may include hundreds or even hundreds of thousands of nodes and edges, with each node having multiple incoming and outgoing edges.

At block 402 in FIG. 4A, a determination about whether a particular world is allowed is started. At block 404, a next active node in the particular world, node X, is identified. If there are no more active nodes, then it is determined at block 410 that this world is allowed (i.e., it has a likelihood greater than zero). If a next node, node X is identified, then processing continues at block 406 where a next reason for or against node X (e.g., an active edge between node X and node Y or "YX") is identified. If a next reason cannot be identified, then processing continues at block 404. Otherwise, a process is initiated at block 408 to determine whether YX is eligible to be a reason for or against node X. The processing performed at block 408 is shown in blocks 414 through 428 of FIG. 4B.

Referring now to FIG. 4B, at block 414, a process is started to determine whether YX is eligible to be a reason for or against node Z. Processing continues at block 416 where a process is started to determine whether node Y is eligible to be a reason for or against node Z. At block 418, it is determined whether node Y is an evidence node. If node Y is an evidence node, then processing continues at block 426, where it is determined that YX is eligible to be a reason for or against node Z. If node Y is not an evidence node, then processing continues at block 420, where it is determined whether node Y is the same as node Z. If node Y is the same as node Z, then processing continues at block 428 where it is determined that edge YX is not eligible to be a reason for or against node Z. Otherwise processing continues at block 422 where a next reason for node Y is identified (e.g., edge WX). If no next reason exists for node Y, then processing continues at block 428, otherwise processing continues at block 424 where it is determined whether WY is eligible to be a reason for Z. If WY is eligible to be a reason for Z, then processing continues at block 426, otherwise processing continues at block 422 to identify a new reason for node Y.

Figure 5:
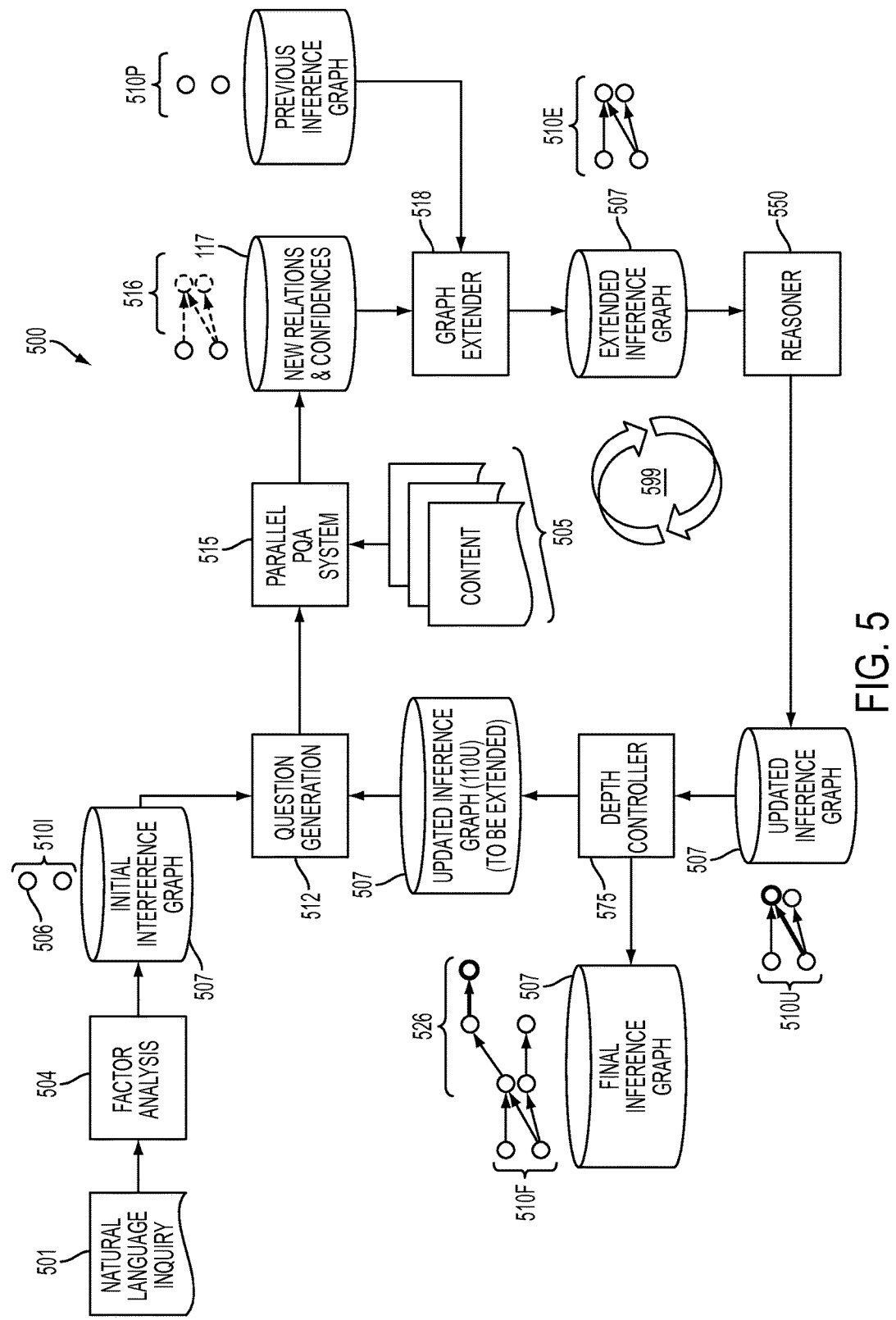
FIG. 5 depicts a high-level block diagram of a schematic of a text-based inference engine where embodiments of inference in a cyclical directed graph can be implemented in accordance with an embodiment.

Turning now to FIG. 5, a high schematic of a text-based inference engine 500 where embodiments described herein can be utilized is generally shown. The text-based inference engine 500 can be implemented by a computer system employing one or more computing devices that perform an iterative process 599 that generates a final inference graph 510F given an input inquiry 501, a set(s) of factors, and determined relations. The text-based inference chaining engine 500 shown in FIG. 5 first implements a factor analysis component 504 implementing programmed processes to extract factors 506 from the input inquiry 501. Programmed processes further generate an initial inference graph 510I using factors extracted from the inquiry. This initial inference graph 510I may only include factors 506 extracted from the inquiry as initial end-points or nodes. This initial inference graph 510I may be stored as data in a storage device 507. Iterative processes 599 can further discover relations to a new set of concepts from the factors 506 that may lead to answers or solutions.

In one aspect, the text-based inference engine 500 provides a system and method that discovers and justifies answers to inquiries by constructing inference graphs over content connecting factors to answers such that each relation in an inference graph is justified by one or more passages from the content and where the inference graph may connect factors to answers over a path containing one or more edges (i.e., multi-step inference graph). Unstructured content is textual data (e.g., books, journals, web pages, documents etc) and is typically used as a source for answers and as a source for justifications of those answers. Is further used to justify or evidence the answer to a question or more specifically the truth of a relation (note: it can consider non-text to determine this). More generally, unstructured content may refer to a combination of text, speech and images. Structured content is any database or knowledgebase where data is encoded as structured relations. A relational database is typical as is a logical-based knowledgebase. Content is any combination of unstructured and structured content.

At the start of the iteration(s), from the generated initial inference graph 510I (or a generated updated inference graph 510U to be extended in a subsequent iteration), a question generator 512 implements a programmed process to first generate questions for the probabilistic question answer (PQA) system 515 to answer. A PQA system 515 is any system or method that produces answers to questions and may associate those answers with confidences indicating the likelihood the answers are correct, and that may associate answers with a passage-based justification that are intended to explain to humans why the answer is likely correct. A question is a single sentence or phrase in natural language (e.g., English) or a formal language (e.g., first order logic) that intends to ask for the end point(s) of a relation or to ask whether or not a relation between two concepts is true. One example is: "What does aspirin treat?"/ treat(aspirin, X). Another example of a question is: "Does Aspirin treat Strokes?"/treat(aspirin, strokes).

An answer or solution is an element of text—a word, number, phrase, sentence, passage or document. An answer is thought to be correct or partially correct with respect to a question or inquiry if a human considers it useful response to the question or inquiry. In the case of a simple question or relation, the answer is typically the sought-after end-point of the relation, e.g., "Who discovered America in 1492?" The answer is the missing concept, X in the relation "X discovered America".

As revised inference graphs are generated at each iteration new questions may be generated for PQA system 515 to answer. Particularly, at each iteration for every new endpoint of every new relation in the inference graph, the question generator 512 formulates one or more questions for the PQA system 515 to answer. Parallel implemented PQA system 515 receives the formulated questions based on the prior inference graph, e.g., graph 510P. Based on the number of independent questions generated, one or more PQA systems 515 may be called in parallel to discover new relations that answer the questions. The PQA system 515 is a type of natural language question-answering system that takes in a natural language question and returns a set of possible answers, a confidence score for each answer indicating a probability the answer is correct, and a set of justifying passages for each answer extracted from the body of content that provides evidence for why the answer may be correct. In one embodiment, IBM DeepQA system may be implemented as the PQA system 515. Other possible QA systems that may be implemented as possible embodiments for the PQA system are Javellin (CMU), Ephera(CMU and Open-Source), SMART(MIT), Wolfram Alpha(Wolfram). These each attempt to produce precise answers to natural language questions but vary in their ability to produce confidence scores and justifying passages.

The PQA system 515 performs processes to obtain or discover new relations 516 that answer the questions from the structured or unstructured content 505. The discovered new relations 516 additionally include confidences and may be stored as data in a storage device 517 which may be or include the storage device 507.

As further shown in FIG. 5, in a current iteration, a graph extender component 518 implements programmed processes to receive the stored new relations and confidences data 517 and extends the previous inference graph 510P generated in the immediately prior iteration (e.g., which is 510I at the first iteration) based on the new relations and confidences data 517. Particularly, graph extender 518 receives the new relations and confidences 517 and processes the new relations by merging them into the previous inference graph 510P to result in a new extended inference graph 510E shown as output from the graph extender 518 and may be stored as data in a storage device 507.

More particularly, the graph extender 518 takes as input the previous inference graph 510P and a set of new relations 516 discovered by the PQA component and outputs a new inference graph 510E that includes the new relations. It performs this by merging nodes in the input inference graphs with nodes in the new relations and adding them to the graph. An example follows:
Input: Inference Graph: A→B→C
Input: New Relations: C1→D
Output: A→B→(C/C1)→D
where C and C1 where merged (considered the same node). The computed confidence on C/C1→D is the same confidence produced by the PQA 515 system's answer to the question about C that produced C1→D.

In one embodiment, merging nodes may be implemented using some form of "specialization". For example, if C was "diabetes", and D was "blindness", the question generated was "What causes blindness?" and the PQA system produces and relation "diabetes mellitus causes blindness" then the graph extender 518 would merge "diabetes" with "diabetes mellitus". In this case the embodiment may only merge nodes if they were identical or if answer was a connected to a more specific concept. Thus, "diabetes" would merge with "diabetes" or with "diabetes mellitus". At this point, confidences are not re-propagated over the extended graph 510E as this is performed by the reasoner component 550.

As shown in FIG. 5, the reasoner component 550 performs programmed processes to propagate computed confidences across the relations to output an updated (for the current iteration) inference graph 510U assured of a particular confidence level across the relations. That is, as part of the reasoner process, additional pruning may be performed as certain relation confidences generated by the PQA system may drop below a set threshold. It may also merge relations based on similarity metrics.

In one embodiment, the reasoner component 550 receives as input: (1) a set of relations between inference graph nodes, (2) factors, and (3) candidate solutions or answers; and outputs a probability for each node in the inference graph. The reasoner component 550 may also optionally output an explanation of why the answer was correct.

Returning to FIG. 5, a depth controller component 575 performs processes to receive the new updated inference graph 510U, and determines a need to halt the iteration based on the specified depth or other criteria. The depth controller component 575 provides the ability for the inference chaining system and method to iteratively extend the initial inference graph formed from the original factors output by factor Analysis. This iterative process will continue to grow the graph unless it is stopped and the depth controller component 575 provides the ability to halt the iterative process based on a specified depth or other criteria.

At each iteration the depth controller component 575 performs a method to analyze the current updated inference graph 510U, and decides if the graph should be considered final and the process halted. The depth controller may be implemented in a variety of ways. For example, the depth controller may look for a pre-determined depth represented by an integer considered the "Depth Threshold" (DT) value, for example, determining if the current iteration has a DT value of 2. In this example, once a graph has extended two steps (relations) from the original factors the iteration will stop and the graph is output as final. Another embodiment may consider a "Confidence Threshold" (CT) value, for example, determining there is a node in graph 510U that has confidence>=CT. In this example, the depth controller 575 would halt the iteration and output the graph 510U as a final inference graph 510F if it contained any node that was associated with a confidence higher than a given CT value. Any combination of depth and confidence threshold may be used in an embodiment of the depth Controller 575. For example the system may halt and output the final graph if the depth controller detects if the graph has reached a certain depth or if it contains a high-confidence node—whichever comes first.

Referring back to FIG. 5, if a need to halt the iteration is determined, the updated inference graph 510U is output as the final inference graph 510F and stored in a storage device 507. At that point final inference graph 510F will include a set of nodes and relations 526 that satisfy the depth or confidence criterion. Otherwise, the updated inference graph 510U is to be extended and is provided as input to question generator component 512 as a new inference graph of nodes and relations for the next iteration 599.

Embodiments of the present invention can be used as part of the reasoner component 550 shown in FIG. 5. The graphs given to the reasoner component 550 can be graphs constructed from knowledge. One way of performing the functions of the reasoner component 550 is through probabilistic inference over graphical models. Embodiments described herein apply to both.

Figure 6:
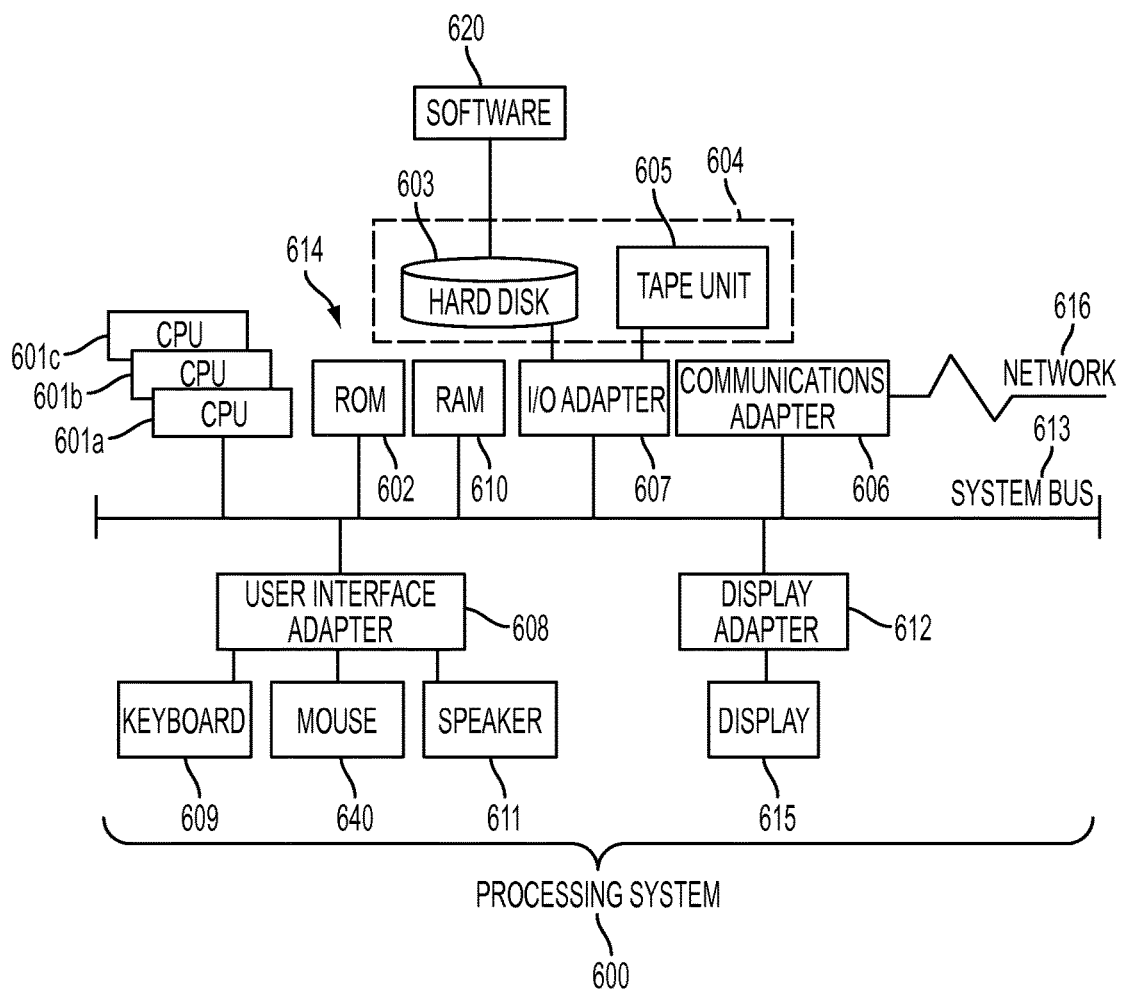
FIG. 6 depicts a processing system in accordance with an embodiment.

Referring now to FIG. 6, there is shown an embodiment of a processing system 600 for implementing the teachings herein. In this embodiment, the processing system 600 has one or more central processing units (processors) 601a, 601b, 601c, etc. (collectively or generically referred to as processor(s) 601). Processors 601, also referred to as processing circuits, are coupled to system memory 614 and various other components via a system bus 613. Read only memory (ROM) 602 is coupled to system bus 613 and may include a basic input/output system (BIOS), which controls certain basic functions of the processing system 600. The system memory 614 can include ROM 602 and random access memory (RAM) 610, which is read-write memory coupled to system bus 613 for use by processors 601.

FIG. 6 further depicts an input/output (I/O) adapter 607 and a network adapter 606 coupled to the system bus 613. I/O adapter 607 may be a small computer system interface (SCSI) adapter that communicates with a hard disk 603 and/or tape storage drive 605 or any other similar component. I/O adapter 607, hard disk 603, and tape storage drive 605 are collectively referred to herein as mass storage 604. Software 620 for execution on processing system 600 may be stored in mass storage 604. The mass storage 604 is an example of a tangible storage medium readable by the processors 601, where the software 620 is stored as instructions for execution by the processors 601 to perform a method, such as the process flow of FIG. 4. Network adapter 606 interconnects system bus 613 with an outside network 616 enabling processing system 600 to communicate with other such systems. A screen (e.g., a display monitor) 615 is connected to system bus 613 by display adapter 612, which may include a graphics controller to improve the performance of graphics intensive applications and a video controller. In one embodiment, adapters 607, 606, and 612 may be connected to one or more I/O buses that are connected to system bus 613 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 613 via user interface adapter 608 and display adapter 612. A keyboard 609, mouse 640, and speaker 611 can be interconnected to system bus 613 via user interface adapter 608, which may include, for example, a Super I/O chip integrating multiple device adapters into a single integrated circuit.

Thus, as configured in FIG. 6, processing system 600 includes processing capability in the form of processors 601, and, storage capability including system memory 614 and mass storage 604, input means such as keyboard 609 and mouse 640, and output capability including speaker 611 and display 615. In one embodiment, a portion of system memory 614 and mass storage 604 collectively store an operating system such as the AIX® operating system from IBM Corporation to coordinate the functions of the various components shown in FIG. 6.

Technical effects and benefits include a simple, intuitive semantics and a tractable algorithm that can be used to extend the power of Bayesian networks to cyclic graphs. Embodiments can also be utilized in situations where the data are noisy or incomplete.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

receiving a natural language question at a question answer (QA) system; and generating, by the QA system, a set of possible answers to the natural language question, the generating comprising:

accessing a cyclical directed graphical model in a data store, the cyclical directed graphical model comprising a plurality of nodes connected by directed edges, each directed edge having an edge strength indicating a degree of relation between the nodes, and each node having a value and a state, the state being one of either active or inactive;

selecting a first node from the plurality of nodes, the first node having at least one incoming directed edge from a second node in the plurality of nodes, the incoming directed edge having an edge strength greater than zero, and the second node having a state of active;

traversing at least a subset of the plurality of nodes in the cyclical directed graphical model in a reverse direction relative to the directed edges, the traversing performed along a path starting from the second node and ending at a third node having a state of active, wherein the traversing is along a plurality of paths including the path that starts from the second node and ends at the third node; and based on the plurality of paths not including the first node, determining an inference about a value of the first node based on a value of the second node, the inference utilized to generate the set of possible answers to the natural language question.

2. The method of claim 1, further comprising:
assigning the inference to the first node.

3. The method of claim 1, further comprising:
based on the plurality of paths including the first node, determining that an inference about the value of the first node based on the value of the second node cannot be made.

4. The method of claim 1, wherein at least one of the directed edges is a generative edge.

5. The method of claim 1, wherein at least one of the directed edges is an inhibitory edge.

6. The method of claim 1, wherein the third node is an evidence node that has a state of active independently of a state of any other node in the cyclical directed graphical model.

7. The method of claim 1, wherein all of the nodes along the path that starts from the second node and ends at the third node have a state of active.

8. The method of claim 1, further comprising performing the selecting, traversing, and determining for the plurality of nodes in the cyclical directed graphical model.

* * * * *